United States Patent Office 3,718,632
Patented Feb. 27, 1973

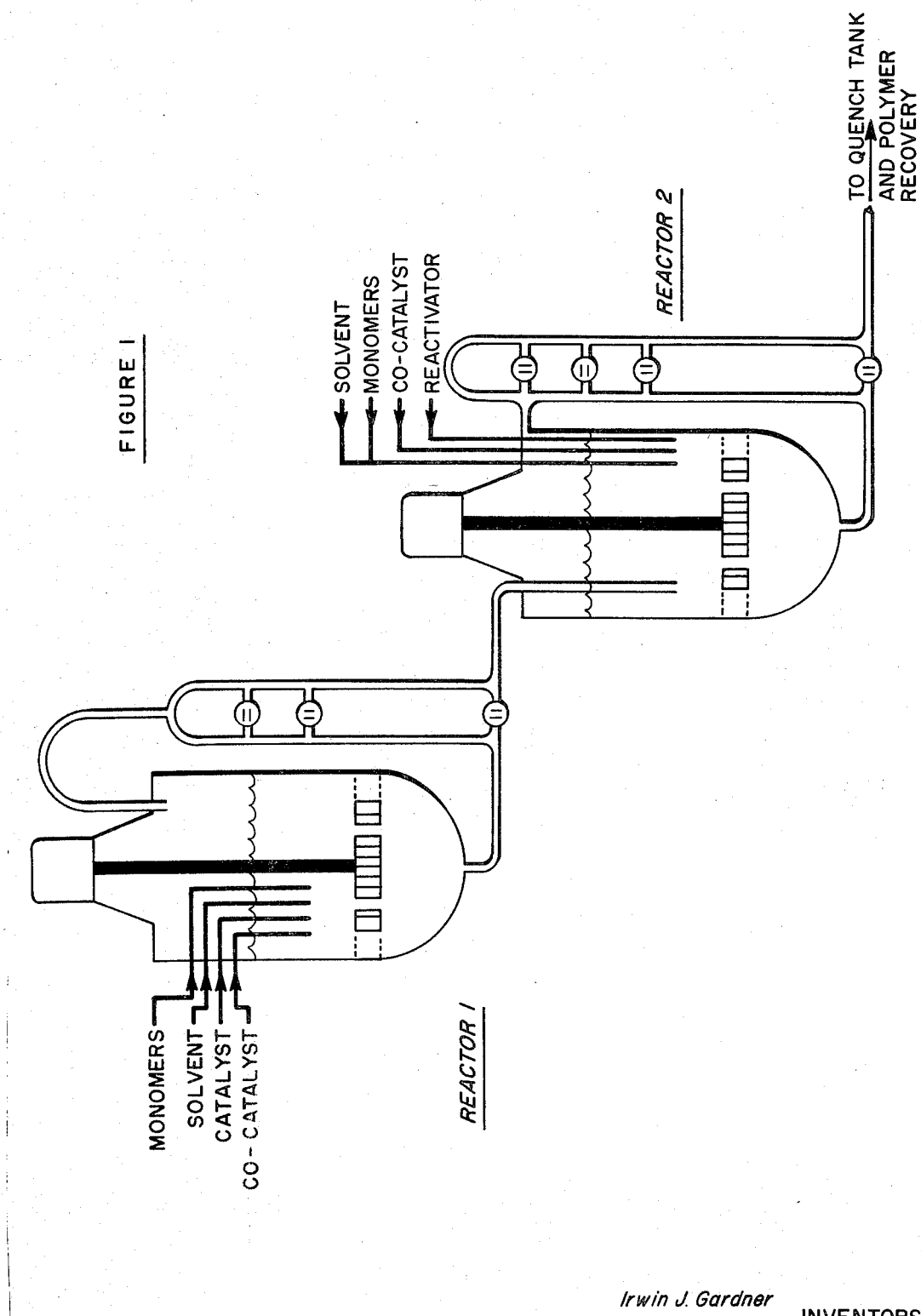

3,718,632
CONTINUOUS PROCESS FOR THE PRODUCTION OF ETHYLENE COPOLYMERS
Irwin J. Gardner, Fanwood, and Charles Cozewith, Westfield, N.J., assignors to Esso Research and Engineering Company
Filed Oct. 19, 1970, Ser. No. 81,895
Int. Cl. C08f 15/40
U.S. Cl. 260—80.78                                   11 Claims

ABSTRACT OF THE DISCLOSURE

Process for the continuous production of elastomeric copolymers of ethylene and one or more higher alpha-olefins having 3 to 8 carbon atoms, preferably propylene; and terpolymers of ethylene, an alpha-olefin of 3 to 8 carbon atoms and a nonconjugated acyclic or alicyclic diolefin comprises a multi-staged reactor system to which solvent, monomers, and a Ziegler-Natta catalyst composition consisting of a transition metal catalyst and an organoaluminum cocatalyst are fed to a first stage wherein polymerization occurs and from which a polymer cement is fed to subsequent stages to which are fed the same or different monomers, organoaluminum cocatalysts and a catalyst reactivator. By means of the multi-staged reactor system, higher rates and conversions of alpha-olefin are achieved, yield of polymer based on the transition metal catalyst is increased by several fold and polymers having a broad range of molecular weights are produced.

FIELD OF THE INVENTION

This invention is concerned with the continuous production of hydrocarbon polymers comprising copolymers of ethylene and an alpha-olefin having from 3 to 8 carbon atoms, and terpolymers of ethylene, an alpha-olefin having from 3 to 8 carbon atoms and a nonconjugated acyclic or alicyclic diolefin in a staged reactor system using a Ziegler-Natta catalyst composition in conjunction with a catalyst reactivator.

DESCRIPTION OF PRIOR ART

The production of elastomeric copolymers of ethylene and propylene, and terpolymers of ethylene, propylene and a nonconjugated acyclic or alicyclic diolefin using Ziegler-Natta catalyst compositions is well known in the art. The catalyst compositions consist of a transition metal compound from Groups IVb, Vb and VIb of the Periodic Table of the elements, particularly compounds of titanium and vanadium, which compounds are designated as primary catalysts, and organometallic reducing compounds from Groups IIa, IIb and IIIa, particularly organo-aluminum compounds which are designated at co-catalysts. For a recent review of the prior art see Chapter 7, p. 679 ff. by G. Natta et al. in Polymer Chemistry of Synthetic Elastomers, edited by Kennedy & Tornquist, 1969 Interscience, N.Y.

The use of staged reactors in series for the production of copolymers and terpolymers is also well known in the art is exemplified by U.S. Patents 2,889,314; 3,047,558 and 3,341,503. There is also considerable prior art on the use of a variety of Ziegler-Natta catalyst promoters and activators notably described in U.S. Patents 3,328,366; 3,380,930 and British Patent 1,112,067. While the latter patents disclose the use of activators which are useful in the practice of the instant invention, none of the references describe or inferentially suggest the unique combination of staged reactors, catalyst, cocatalyst and catalyst activator to achieve the yield and properties of the polymers produced by this invention.

SUMMARY OF THE INVENTION

This invention relates to a process for the continuous production of elastomeric copolymers of: ethylene and one or more higher alpha-olefins having from 3 to 8 carbon atoms, preferably propylene (EPM); and terepolymers of ethylene, an alpha-olefin having from 3 to 8 carbon atoms and a nonconjugated acyclic or alicyclic diolefin (EPDM). The process utilizes a staged-reactor system at atmospheric or higher pressure to which solvent, monomers, and a Ziegler-Natta catalyst composition consisting of a transition metal catalyst and an organoaluminum cocatalyst are continuously fed to a first stage, wherein polymerization occurs. The polymer cement formed in the first stage is fed continuously to subsequent stages, arranged in series, to which are fed, the same or different monomers, only the organoaluminum cocatalyst component of the Ziegler-Natta catalyst composition and a reactivator for the transition metal catalyst component fed originally to the first stage.

By means of the process of this invention, polymerization rates, yield, and monomer conversions are increased, with a corresponding decrease in the cost of de-ashing and recovering the polymer.

GENERAL DESCRIPTION OF INVENTION

Referring to FIG. 1, monomers, solvent, catalyst and cocatalyst are fed continuously to stirred reactor 1 to effect polymerization. Without quenching or inactivating the catalyst components, the polymer cement is fed to a second stirred reactor where the same or different monomers, cocatalyst and a catalyst reactivator are fed continuously in order to further polymerize the monomers. Conventional "harp" arrangements can be used for maintaining the desired level in the reactors and a variety of means for heat exchange (not shown) are employed for maintaining the temperature of the reaction mixtures in the proper operating range. Conventional procedures, and inactivating media are used, following the last reactor, to inactivate the combined catalyst components and recover unreacted monomers, solvent and finished polymer from the reaction mixture. In common with all Ziegler-Natta polymerizations, all of the monomers, solvents and catalyst components are rigorously dried and freed from dissolved moisture, oxygen, or other constituents which are known to be harmful to the activity of the catalyst system, and the feed tanks, lines and reactors may be protected by blanketing with a dry, inert gas such as nitrogen.

Hydrogen may be fed through independent lines to any stage or with the solvent to the first stage, or with the monomers in subsequent stages for the purpose of controlling the molecular weight.

Monomers

While the invention disclosed herein is suitable for the homopolymerization of alpha-olefins such as ethylene, propylene, butene-1 and the like, a major object of this invention is the production of amorphous elastomeric copolymers of ethylene and a $C_3$ to $C_8$ alpha-olefin, and elastomeric terpolymers of ethylene, a $C_3$ to $C_8$ alpha-olefin and an acrylic or alicyclic nonconjugated diolefin.

Representative nonlimiting examples of $C_3$ to $C_8$ alpha-olefins that may be used as monomers with ethylene for the production of copolymers or terpolymers include:

(A) Straight-chain acyclic alpha-olefin such as: propylene, butene-1, pentene-1, hexene-1 and octene-1.

(B) Branched chain acyclic alpha-olefins such as: 3-methyl butene-1, 4-methyl pentene-1 and 5,5-dimethyl hexene-1.

(C) Alicyclic, i.e. carbocyclic, alpha-olefins such as: vinyl cyclopentane, allyl cyclopentane and vinyl cyclohexane.

Representative nonlimiting examples of nonconjugated diolefins that may be used as the third monomer in the terpolymer include:

(A) Straight-chain acyclic dienes such as: 1,4-hexadiene; 1,5-hexadiene; 1,6-octadiene.

(B) Branched chain acyclic dienes such as: 5-methyl 1,4-hexadiene, 3,7 - dimethyl, 1,6-octadiene; 3,7-dimethyl 1,7-octadiene; and the mixed isomers of dihydro-myrcene and dihydro-ocimene.

(C) Single ring alicyclic dienes such as: 1,4-cyclohexadiene; 1,5-cyclo-octadiene; 1,5-cyclododecadiene; 4-vinyl-cyclohexene; 1-allyl-4-isopropylidene cyclohexane; 3-allyl cyclopentene; 4-allyl cyclohexene and 1-isopropylenyl 4-(4-butenyl) cyclohexane.

(D) Multiring alicyclic fused and bridged ring dienes such as: tetrahydroindene; methyltetrahydroindene; dicyclopentadiene; bicyclo (2,2,1) hepta 2,5-diene; 2-methyl bicycloheptadiene; alkenyl, alkylidene, cyclo-alkenyl and cyclo-alkylidene norbornenes such as 5-methylene norbornene, 5-ethylidene norbornene, 5-propenyl norbornene, 5-isopropylidene norbornene, 5-(4-cyclopentenyl) norbornene; 5-cyclohexylidene norbornene.

In general, useful nonconjugated diolefins contain from 5 to 14 carbon atoms and terpolymers containing the same exhibit viscosity average molecular weights ranging from about 70,000 to 350,000, preferably from about 100,000 to 250,000 as determined in Decalin at 135° C.

Structurally the terpolymers of the instant invention may be illustrated for various third nonconjugated diene monomers as random polymers having the following moieties:

(1) 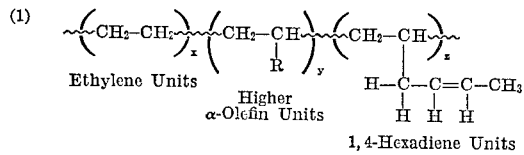

1,4-Hexadiene Units (2) 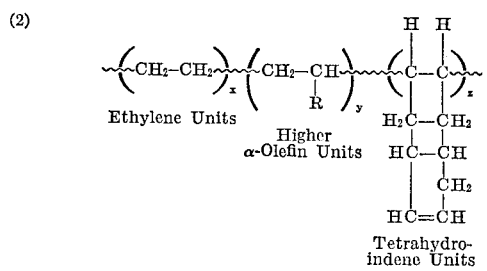

Tetrahydroindene Units (3) 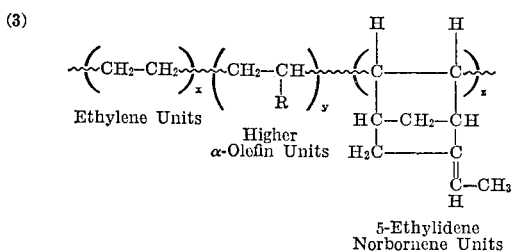

5-Ethylidene Norbornene Units in which $x$, $y$ and $z$ are integers, typically in the range of 1 to 15.

Solvents and dispersants

Suitable media for dissolving or dispersing the catalyst components and reaction products and for heat exchange may be selected from the general group of petroleum hydrocarbons and halogenated hydrocarbons. $C_{12}$ or lower, straight or branched chain saturated hydrocarbons are preferred but $C_5$ to $C_9$ saturated alicyclic or aromatic hydrocarbons may be used with equal facility. Halogenated hydrocarbons having two to six carbons in the molecule are also useful. Representative nonlimiting solvents and dispersants which are also useful for the removal of the heat of reaction are: propane, butane, pentane, cyclopentane, hexane, cyclohexane, methyl cyclopentane, heptane, methyl cyclohexane, isooctane, benzene, toluene, mixed xylenes, cumene, dichloroethane, trichloroethane and ortho-dichloro benzene.

Principal catalysts

Catalysts useful in the practice of this invention are selected from the group of transition metal compounds comprising Groups IV$b$, V$b$ and VI$b$ of the Periodic Table of the elements. Particularly useful are compounds of vanadium and titanium. Most preferred are compounds of vanadium having the general formula $VO_zX_t$ wherein $z$ has a value of zero or one and $t$ has a value of two to four. X is independently selected from the group consisting of halogens having an atomic number equal to or greater than 17, acetylacetonates, haloacetylacetonates, alkoxides and haloalkoxides. Nonlimiting examples are: $VOCl_3$; $VO(AcAc)_2$; $VOCl_2(OBu)$; $V(AcAc)_3$ and $VOCl_2AcAc$ where (AcAc) is an acetyl acetonate.

Titanium compounds which can be used in combination with vanadium compounds, have the general formula $Ti(OR)_4$ wherein R is an acyclic or alicyclic monovalent hydrocarbon radical of one to twelve carbon atoms.

Most preferred among the useful catalysts are vanadyl trichloride ($VOCl_3$), vanadium tetrachloride ($VCl_4$) and tetrabutyl titanate ($Ti(OBu)_4$) used in combination with $VOCl_3$.

Cocatalysts

Cocatalysts useful in the practice of this invention comprise organometallic reducing compounds from Groups II$a$, II$b$ and III$a$, particularly organoaluminum compounds having the general formula $AlR'_mX'_n$ wherein R' is a monovalent hydrocarbon radical selected from the group consisting of $C_1$–$C_{12}$ alkyl, alkylaryl, arylalkyl and cycloalkyl radicals, $m$ is a number from 1 to 3, X' is a halogen having an atomic number equal to or greater than 17 (Cl, Br and I) and the sum of $m$ and $n$ is equal to three. Various mixtures of cocatalyst may be employed.

Nonlimiting examples of useful cocatalysts are $Al(Et)_3$, $Al(isoBu)_3$, $Et_2AlCl$, $EtAlCl_2$ and $Et_3Al_2Cl_3$.

Catalyst reactivators

Halo-sulfonyl and sulfinyl compounds having the general formula $R''SO_nY$ wherein R'' is selected from the group consisting of $C_2$–$C_{12}$ alkyl, aryl, alkylaryl, arylalkyl and cycloalkyl hydrocarbons, $n$ is an integer equal to 1 or 2 and Y is a halogen having an atomic number equal to or greater than 17 (Cl, Br and I), are the preferred catalyst reactivators for the practice of this invention.

Nonlimiting examples of useful reactivators are ethanesulfonyl chloride, butane sulfonyl chloride, octane sulfonyl chloride, dodecane sulfonyl chloride, cyclohexane sulfonyl chloride, benzene sulfonyl chloride, benzene sulfinyl chloride, benzene sulfinyl iodide, alpha and beta naphthalene sulfonyl bromides, dimethyl naphthalene sulfonyl chloride, ortho and para toluene sulfonyl chlorides, and sulfonyl halides of mixed xylenes. Most preferred, as a catalyst reactivator, for use in the second and subsequent reactor stages is benzene sulfonyl chloride.

Reaction conditions (1) Temperature: Suitable temperatures for conducting the polymerization are −50° C. to 80° C., preferably 0° C. to 50° C., most preferably 10° C. to 45° C. Temperature is not a critical parameter and the choice will depend on the design and materials of construction of the reactors, type and speed of stirring equipment, feed rates of reactants per unit volume and most importantly the method and equipment for removing and controlling the heat of reaction.

(2) Pressure: The pressure at which the polymerization is conducted will depend on the temperature of reaction and polymerization rate but in any case, the pressure Yield: 46.2 grams/hour 2280 grams/grams VOCl$_3$
I.V. Decalin at 135° C.: 3.7
$\bar{M}_n$: 100,000
Wt. percent ethylene in polymer: 60.1

Example 3

An EPDM elastomer consisting of the terpolymer of ethylene, propylene and 5-ethylidene 2-norbornene was synthesized in the same equipment as Examples 1 and 2 under the following conditions:

Reactor 1:
 Solvent-heptane: 1.35 liters/hr.
 Catalyst: VOCl$_3$: 0.083 millimole/hr.
 Cocatalysts:
  Et$_2$AlCl—0.42 millimole/hr.
  Et$_3$Al$_2$Cl$_3$—0.42 millimole/hr.
 Ethylene: 0.625 liter/min.
 Propylene: 1.875 liters/min.
 5-ethylidene-2-norbornene: 0.5 gram/hr.
Reactor 2:
 Cat. reactivator C$_6$H$_5$SO$_2$Cl: 0.5 millimole/hr.
 Coatalyst Et$_3$Al$_2$Cl$_3$: 0.83 millimole/hr.
 Ethylene: 0.875 liter/min.
 Propylene: 1.625 liters/min.
 5-ethylidene-2-norbornene: 0.5 grams/hr.
 Yield: 29.9 grams/hr. 2080 grams/gram VOCl$_3$
 I.V. (Decalin at 135° C.): 2.71
 $\bar{M}_n$: 169,000
 Wt. percent ethylene in terpolymer: 55.8

Example 4

A series of pilot-plant runs for the production of an ethylene-propylene copolymer (EPM) were made in reactors arranged as in FIG. 1. Reactor 1 had a volume of 1 gallon (3.785 liters) and reactor 2 a volume of 3 gallons (11.36 liters). Feed rates of a purified hexane solvent and reactants were set to give a residence time in the first reactor of 13.5 minutes and in the second reactor of 25 minutes. Table I gives the experimental details and the properties of the copolymers obtained after recovery.

In Run 4a, catalyst (VOCl$_3$) and cocatalyst (Et$_2$AlCl) were fed only to the first reactor, with no addition of either cocatalyst or catalyst reactinator (C$_6$H$_5$SO$_2$Cl) to the second reactor.

In Runs 4b–4d, increasing quantities of cocatalyst and catalyst reactivator were fed to the second reactor while maintaining the mole ratio of Et$_2$AlCl to C$_6$H$_5$SO$_2$Cl constant at unity. The results show improved reaction rate, catalyst efficiency and monomer conversion with increasing ratio of cocatalyst and reactivator to catalyst fed to the second reactor.

TABLE I

| Run number | 4a | 4b | 4c | 4d |
|---|---|---|---|---|
| Temperature, °C.: | | | | |
| Reactor 1 | 30 | 30 | 30 | 30 |
| Reactor 2 | 30 | 30 | 30 | 30 |
| Ethylene, lb./100 lb. hexane: | | | | |
| Reactor 1 | 2.4 | 2.4 | 2.4 | 2.4 |
| Reactor 2 | 1.6 | 1.6 | 1.6 | 1.6 |
| Propylene, lb./100 lb. hexane: | | | | |
| Reactor 1 | 10.0 | 10.0 | 10.0 | 10.0 |
| Reactor 2 | 3.0 | 3.0 | 3.0 | 3.0 |
| VOCl$_3$ cat., lb./100 lb. hexane—Fed to reactor 1 only | 0.01 | 0.01 | 0.01 | 0.01 |
| Et$_2$AlCl Cocat., lb./100 lb. hexane: | | | | |
| Reactor 1 | .024 | .024 | .024 | .024 |
| Reactor 2 | None | .007 | .014 | .020 |
| C$_6$H$_5$SO$_2$Cl, lb./100 lb. hexane—Fed to reactor 2 only | None | .0102 | .0204 | .0306 |
| C$_6$H$_5$SO$_2$Cl/VOCl$_3$, mole ratio | | 1.0 | 2.0 | 3.0 |
| Et$_2$AlCl/VOCl$_3$, mole ratio: | | | | |
| Reactor 1 | 3.5 | 3.5 | 3.5 | 3.5 |
| Reactor 2 | | 1.0 | 2.0 | 3.0 |
| Copolymer production, gm./hr | 317 | 568 | 585 | 667 |
| Catalyst efficiency, gms. polymer/gm. VOCl$_3$ | 317 | 568 | 585 | 667 |
| Monomer conversion: | | | | |
| Wt. percent ethylene | 45.3 | 78.0 | 80.0 | 85.6 |
| Wt. percent propylene | 10.4 | 19.7 | 20.4 | 25.0 |
| Wt. percent ethylene in polymer | 56.3 | 54.9 | 54.7 | 51.3 |
| Polymer inherent viscosity | 3.55 | 4.05 | 3.6 | 3.1 |
| Mooney viscosity, 212° F., 1+8' | 68.5 | 67.5 | 59 | 46 |

Example 5

A similar series of Runs (5a–5d) were made in the same equipment. Residence times in the reactors were the same as in Runs 4a–4d. In this series, the feed rate for catalyst and cocatalyst in reactor 1 and catalyst reactivator in reactor 2 were held constant but the cocatalyst addition was varied to the second reactor. The mole ratio of Et$_2$AlCl to C$_6$H$_5$SO$_2$Cl was varied from Run 5b to 5d. Table II gives the experimental details and properties of the copolymers obtained after recovery.

It will be seen in a comparison of Runs 4a and 5a that with no addition of Et$_2$AlCl to the second reactor in Run 5a, that the addition of C$_6$H$_5$SO$_2$Cl nearly doubled the rate of polymer production and more than doubled the catalyst efficiency. Maintaining the addition of C$_6$H$_5$SO$_2$Cl at a constant level to the second reactor but increasing the addition of Et$_2$AlCl nearly tripled the rate of polymer production and more than tripled the catalyst efficiency. In all cases, the addition of C$_6$H$_5$SO$_2$Cl to the second reactor increased monomer conversion without sacrifice of the ethylene content of the polymer.

TABLE II

| Run number | 5a | 5b | 5c | 5d |
|---|---|---|---|---|
| Temperature, °C.: | | | | |
| Reactor 1 | 30 | 30 | 30 | 30 |
| Reactor 2 | 36 | 42 | 44 | 47 |
| Ethylene, lb./100 lb. hexane | | | | |
| Reactor 1 | 2.4 | 2.4 | 2.4 | 2.4 |
| Reactor 2 | 1.6 | 1.6 | 1.6 | 1.6 |
| Propylene, lb./100 lb. hexane | | | | |
| Reactor 1 | 10.0 | 10.0 | 10.0 | 10.0 |
| Reactor 2 | 3.0 | 3.0 | 3.0 | 3.0 |
| VOCl$_3$ cat., lb./100 lb. hexane—Fed to reactor 1 only | .008 | .008 | .008 | .008 |
| Et$_2$AlCl cocat., lb./100 lb. hexane: | | | | |
| Reactor 1 | .0195 | .1095 | .0195 | .0195 |
| Reactor 2 | None | .0056 | .1112 | .0168 |
| C$_6$H$_5$SO$_2$Cl, lb./100 lb. hexane—Fed to reactor 2 only | .0082 | .0082 | .0082 | .0082 |
| C$_6$H$_5$SO$_2$Cl/VOCl$_3$, mole ratio | 2.0 | 2.0 | 2.0 | 2.0 |
| Et$_2$AlCl/VOCl$_3$, mole ratio: | | | | |
| Reactor 1 | 3.5 | 3.5 | 3.5 | 3.5 |
| Reactor | | 1.0 | 2.0 | 3.0 |
| Copolymer production, gm./hr | 550 | 693 | 715 | 738 |
| Catalyst efficiency, gms. polymer/gm. VOCl$_3$ | 688 | 865 | 895 | 922 |
| Monomer conversion: | | | | |
| Wt. percent ethylene | 69.8 | 87.2 | 86.9 | 90.0 |
| Wt. percent propylene | 20.8 | 26.5 | 28.2 | 29.1 |
| Wt. percent ethylene in polymer | 50.8 | 50.4 | 48.6 | 48.8 |
| Polymer inherent viscosity | | 3.4 | 3.25 | 2.9 |
| Mooney viscosity, 212°F., 1+8' | 63.5 | 56.5 | 48 | 42 |

Example 6

The advantages that accrue to the use of a staged reactor system for the continuous production of an ethylene-propylene copolymer in which the catalyst is fed only to the first reactor and a catalyst-reactivator is fed to subsequent reactors compared to a single reactor in which an attempt was made to produce copolymer continuously is illustrated in the following example.

A 1.5 liter jacketed reactor equipped with stirrer, inlet tubes for solvent, catalyst, cocatalyst and catalyst reactivator and an outlet tube for polymer cement was charged with 1 liter of purified heptane. Feed rates for solvent, ethylene and propylene were set as follows:

Ethylene _____liters per minute__ 0.9
Propylene _____liters per minute__ 3.1
Heptane _____liters per hour__ 3.4

Stock solutions were prepared as follows:

1.25 millimoles VOCl$_3$ in 500 ml. heptane
25.0 millimoles Et$_3$Al$_2$Cl$_3$ in 500 ml. heptane
30.0 millimoles C$_6$H$_5$SO$_2$Cl in 500 ml. heptane Catalyst and cocatalyst solutions were fed by precision pump to the reactor at a rate of 2 ml. per minute and when reaction started the temperature was maintained at 25° C. by circulating water through the jacket. When steady state conditions had been established and polymer cement was overflowing from the reactor, addition of catalyst-reactivator was started.

is maintained at a sufficient level so as to be equal to the combined vapor pressure of the solvent and reaction components. For the most preferred temperature range, the pressure required to maintain the reactants in the liquid phase is in the order of 60–150 p.s.i.g.

(3) Monomer concentration: Depending on whether an EPM copolymer elastomer or EPDM terpolymer elastomer is to be produced, the monomers can be fed to the first and subsequent stages in a preferred mole ratio. Monomer feeds to all stages can be set for a typical EPDM for example: Ethylene, 2 to 15 pts. by wt. per 100 pts. by wt. of solvent; Propylene, 4 to 30 pts. by wt. per 100 pts. by wt. of solvent, preferably 6 to 20 pts. by wt. per 100 pts. by wt. of solvent; and Ethylidene norbornene, 0.1 to 5 pts. by wt. per 100 pts. by wt. of solvent, preferably 0.3 to 3 pts. by wt. per 100 pts. by wt. of solvent.

(4) Catalyst concentration: Transition metal catalyst, for example $VOCl_3$, prediluted, if desired, with solvent is fed to the first reactor so as to provide a concentration in the total solvent of from 0.01 to 5.0 millimoles per liter, preferably 0.05 to 0.5 millimole per liter.

The organoaluminum cocatalyst which may also be prediluted with solvent is fed at the same time to the first stage in a sufficient amount to promote the transition metal catalyst to maximum activity. Typical mole ratios of organo-aluminum compound to transition metal catalyst is in the range of 2 to 20 moles of organoaluminum compound per mole of transition metal compound.

An amount of organoaluminum compound equal to, less than, or greater than the amount of organoaluminum compound fed to the first stage reactor, may be fed to subsequent reactors.

Catalyst reactivator, fed only to the second and subsequent stages, and dissolved in solvent if desired, is fed in an amount at least equal to the moles of transition metal compound fed to the first stage but may be equal to or less than the total moles of organoaluminum compound fed to all stages.

Hydrogen, for the control of molecular weight and molecular weight distribution may be fed to all stages in the proportion of 10 to 10,000 p.p.m. of ethylene.

From the above it will be seen that in accordance with this invention any combination of monomers, cocatalysts, hydrogen and reactivator may be added to any stage following the first stage. In no case is transition metal catalyst added to any stage except the first. And in no case is the catalyst reactivator fed into the first stage.

DESCRIPTION OF PREFERRED EMBODIMENTS

The following examples more fully illustrate the instant invention and show the improvement over the prior art.

Example 1

Two reactors, provided with cooling jackets (not shown) arranged in series as in FIG. 1 were used for the following experiments. Under steady state conditions, the volume of reactor 1 at overflow was 386 ml. and the volume of reactor 2 was 1037 ml. Temperatures were maintained in reactor 1 by prechilling the reactor feed and in reactor 2 by circulating chilled water upon demand of a sensitive temperature controller. Catalyst component and reactivator feeds to the reactors were accurately metered by means of a feed pump.

Catalyst and cocatalyst solutions were prepared for reactor No. 1 by diluting 0.75 millimole of $VOCl_3$ and 12 millimoles of $Et_3Al_2Cl_3$ to 360 ml. with n-heptane in separate pump reservoirs; and 3 millimoles of $Et_3Al_2Cl_3$ and 16 millimoles of benzene sulfonyl chloride were similarly diluted to 360 ml. with n-heptane in separate pump reservoirs for feeding to reactor No. 2. Pump feeds were adjusted so as to feed each of the catalyst and reactivator components to their respective stages at a feed rate of 1 ml. per minute.

Normal heptane, freed of impurities by percolation through columns filled with Linde 5A molecular sieves and silica gel was prechilled and fed to reactor No. 1 at a rate of 35 mil per min. Polymerization grade ethylene and propylene were fed to reactor 1 at a rate of 0.625 liters per minute and 1.88 liters per minute respectively, and after steady state conditions had been established, the feeds to the second reactor were 1.25 liters of ethylene per minute and 1.375 liters of propylene per minute. Temperature of both reactors was maintained at 25° C.

Ethylene-propylene copolymer produced in the first stage was fed as a cement to the second stage where additional polymer was synthesized. Analysis of the cement leaving reactor 1 indicated a catalyst efficiency of 605 grams of copolymer per gram of $VOCl_3$ and similar analysis of the cement leaving reactor 2 indicated a catalyst efficiency of 4400 grams of copolymer per gram of $VOCl_3$ originally fed only to reactor No. 1. The polymer leaving the first stage contained 62 wt. percent of ethylene while the polymer leaving the second stage contained 50 wt. percent of ethylene.

Analysis of the polymer for ethylene content was by the method of Drushel and Iddings: Analytical Chemistry 35, 28–33 (1963). Recent work, done after these analyses were made, indicates that the values for the weight percent of ethylene in the copolymer, obtained by the above method are approximately ten percent too high. Values reported herein are uncorrected.

The polymer cement leaving reactor No. 2 was quenched with isopropanol, washed thoroughly to remove catalyst residues and dried by conventional procedures. Analysis of the polymer crumb yielded the following data:

Inherent viscosity: 3.44 (Decalin at 35° C.)

Number average molecular weight ($\overline{M}_n$): 154,000

Example 2

Two runs were made for the production of ethylene-propylene copolymer using the same equipment as in Example 1. Hydrogen was fed to the second stage in order to control molecular weight and molecular weight distribution. Catalysts, cocatalysts and catalyst-reactivator were predissolved in solvent and fed at a rate of 1 ml. per minute to give the indicated feed rate in millimoles per hour.

Feed rates—Example 2A

Reactor 1:
  Solvent heptane: 1.8 liters per hour
  Catalyst—$VOCl_3$: 0.10 millimole per hour
  Cocatalyst—$Et_2AlCl$: 0.3 millimole per hour
  Ethylene: 0.625 liter per min.
  Propylene: 1.875 liters per min.

Reactor 2:
  Cocatalyst—$Et_3Al_2Cl_3$: 1.0 millimole per hour
  Ethylene: 0.875 liter per min.
  Propylene: 1.625 liters per min.
  Cat. reactivator: $C_6H_5SO_2Cl$: 0.6 millimole per hr.
  Hydrogen: 0.112 liter per hour
  Yield: 29.4 grams/hour 1700 grams/gram $VOCl_3$
  I.V.-Decalin at 135° C.: 2.90
  $\overline{M}_n$: 66,700
  Wt. percent ethylene in polymer: 58.2

Feed rates—Example 2B

Reactor 1:
  Solvent heptane: 1.8 liters per hour
  Catalyst: $VOCl_3$: 0.1 millimole per hour
  Cocatalyst: $Et_2AlCl$: 0.6 millimole per hour
  Ethylene: 0.625 liter per min.
  Propylene: 1.875 liters per min.

Reactor 2:
  Cocatalyst: $Et_3Al_2Cl_3$: 1.0 millimole per hour
  Ethylene: 0.875 liter per min.
  Propylene: 1.625 liters per min.
  Cat. reactivator: $C_6H_5SO_2Cl$: 0.6 millimole per hr.
  Hydrogen: 0.224 liter per hour Addition of the reactivator caused immediate cessation of the reaction and formation of polymer stopped.

While we have above described a number of specific embodiments of the present invention, it is obviously possible to practice various equivalent embodiments and equivalent modifications thereof without departing from the spirit and scope of the invention.

What is claimed is:

1. In a continuous process for the production of elastomeric copolymers of ethylene and a higher $C_3$ to $C_8$ alpha-olefin, which may additionally have polymerized therewith an acyclic or alicyclic nonconjugated diolefin, comprising a staged-reactor system in series, the first reactor having added thereto:

ethylene, a higher $C_3$ to $C_8$ alpha-olefin, or additionally an acyclic or alicyclic nonconjugated diolefin, a Ziegler-Natta catalyst composition consisting of a transition metal component and an organoaluminum co-catalyst at a mole ratio of aluminum compound to transition metal component ranging from 2 to 20, and a solvent; the polymerization therein being conducted at an essentially uniform temperature of from about $-50°$ C. to $80°$ C. and a pressure at least equal to the combined vapor pressure of the solvent and reaction components;

the improvement which comprises:

(a) feeding to the second reactor the effluent polymer cement from the first reactor, additional higher $C_3$ to $C_8$ alpha-olefin, additional organaluminum cocatalyst, and a reactivator comprising a halo-sulfonyl or sulfinyl compound having the general formula $$R—SO_n—Y$$

wherein R represents a $C_2$ to $C_{12}$ alkyl, aryl, alkaryl, arylalkyl or cycloalkyl hydrocarbons, $n$ is an integer equal to 1 or 2, and Y is a halogen having an atomic number equal to or greater than 17;

(b) subjecting the contents of the second reactor to the same reaction conditions as in the first reactor, for a time sufficient to form a final polymer cement in said second reactor;

(c) transferring said final polymer cement from said second reactor to a quench tank;

(d) quenching said final polymer cement with an inactivating medium for said catalyst components; and (e) recovering the polymer from said quenched cement.

2. The improved process of claim 1, wherein hydrogen is added to at least one reactor stage.

3. The improved process of claim 1, wherein the higher $C_3$ to $C_8$ alpha-olefin is propylene.

4. The improved process of claim 1, wherein the nonconjugated diolefin is selected from the group consisting of 1,4-hexadiene, dicyclopentadiene, 5-methylene-2-norbornene, 5-ethylidene-2-norbornene, or 2-methyl norbornadiene.

5. The improved process of claim 1 wherein said transition metal component is a vanadium compound having the general formula $VO_zX_t$ wherein z has a value of zero or one, $t$ has a value of two to four and X is independently selected from the group consisting of halogens having an atomic number equal to or greater than 17, acetylacetonates haloacetylacetonates, and alkoxides (OR) wherein R is a $C_1$ to $C_{12}$ monovalent hydrocarbon radical.

6. The improved process of claim 1, wherein said transition metal component is $VCl_4$ or $VOCl_3$ or a combination of $VOCl_3$ with $Ti(OR)_4$ wherein R is an acyclic or alicyclic monovalent hydrocarbon radical of one to twelve carbon atoms.

7. The improved process of claim 1, wherein said organoaluminum cocatalyst is selected from the group consisting of aluminum triethyl, aluminum triisobutyl, ethyl aluminum dichloride, diethyl aluminum chloride, ethyl aluminum sesquichloride, and mixtures thereof.

8. The improved process of claim 1, wherein said reactivator is an aryl sulfonyl halide.

9. In a continuous process for the production of elastomeric copolymer from ethylene, propylene and an acyclic or alicyclic nonconjugated diolefin, comprising a staged reactor system in series, having a first reactor and a second reactor, the first reactor being charged with said monomers; a Ziegler-Natta catalyst composition consisting of from 0.01 to 5.0 millimoles per liter of $VOCl_3$ and an organoaluminum cocatalyst, the mole ratio of Al/V being from 2 to 20; a hydrocarbon solvent; the monomers being polymerized in said first reactor at an essentially uniform temperature of from $10°$ C. to $45°$ C. and a pressure of from about 60 to 150 p.s.i.g., for a time sufficient to form a polymer cement containing deactivated catalyst; the improvement consisting of:

(a) feeding to the second reactor the effluent polymer cement from the first reactor; from 4 to 30 parts by weight propylene per 100 parts by weight of solvent; a hydrocarbon solvent; benzene sulfonyl chloride in an amount at least equal to the $VOCl_3$ added to the first reactor; additional organoaluminum cocatalyst, the mole ratio of organoaluminum compound to benzene sulfonyl chloride ranging from 1 to 3;

(b) subjecting the contents of the second reactor to the same reaction conditions as in the first reactor, to form a final polymer cement in said second reactor;

(c) transferring said final polymer cement from said second reactor to a quench tank;

(d) quenching said final polymer cement with an inactivating medium for said catalyst components; and (e) recovering said elastomeric copolymer from said quenched cement.

10. The improved process of claim 9, wherein said organoaluminum cocatalyst is selected from the group consisting of aluminum triethyl, aluminum triisobutyl, ethyl aluminum dichloride, diethyl aluminum chloride, ethyl aluminum sesquichloride, or mixtures thereof.

11. The improved process of claim 9, wherein the $VOCl_3$ transition metal component has mixed therewith, before addition to said first reactor, tetrabutyl titanate $[Ti(OBu)_4]$.

References Cited

UNITED STATES PATENTS

| | | | |
|---|---|---|---|
| 3,035,040 | 5/1962 | Findlay | 260—94.9 |
| 3,074,922 | 1/1963 | Dye | 260—94.9 |
| 3,160,622 | 12/1964 | Gilbert | 260—94.9 |
| 3,523,929 | 8/1970 | Paige | 260—80.78 |
| 3,341,503 | 9/1967 | Paige | 260—80.78 |
| 3,629,212 | 12/1971 | Benedikter | 260—80.78 |

JAMES A. SEIDLECK, Primary Examiner

R. S. BENJAMIN, Assistant Examiner

U.S. Cl. X.R.

260—88.2